(12) United States Patent
Yeh et al.

(10) Patent No.: US 6,930,844 B2
(45) Date of Patent: Aug. 16, 2005

(54) HIGH PRECISION FLY HEIGHT MEASUREMENT

(75) Inventors: Nan-Husing Yeh, Foster City, CA (US); Don R. Bloyer, Eden Prairie, MN (US); John W. Dykes, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 134 days.

(21) Appl. No.: 10/440,885

(22) Filed: May 19, 2003

(65) Prior Publication Data

US 2004/0233561 A1 Nov. 25, 2004

(51) Int. Cl.$^7$ .......................... G11B 27/36; G11B 21/02
(52) U.S. Cl. .......................................... 360/31; 360/75
(58) Field of Search ..................................... 360/31, 75

(56) References Cited

U.S. PATENT DOCUMENTS

| | | | |
|---|---|---|---|
| 4,146,911 A | * | 3/1979 | Gyi et al. .................... 360/75 |
| 4,777,544 A | | 10/1988 | Brown |
| 4,841,389 A | * | 6/1989 | Hoyt et al. .................. 360/75 |
| 5,130,866 A | | 7/1992 | Klaassen |
| 5,377,058 A | | 12/1994 | Good |
| 5,784,296 A | | 7/1998 | Baker |
| 5,892,632 A | | 4/1999 | Behrens |
| 5,909,330 A | * | 6/1999 | Carlson et al. .............. 360/31 |
| 6,208,477 B1 | * | 3/2001 | Cloke et al. ................. 360/31 |
| 6,249,393 B1 | | 6/2001 | Billings |
| 6,274,233 B1 | | 8/2001 | Yoshikawa |
| 6,314,212 B1 | | 11/2001 | Womack |
| 6,507,546 B1 | | 1/2003 | Bliss |
| 2003/0022024 A1 | | 1/2003 | Wachenschwanz |

OTHER PUBLICATIONS

Palmer et al, Identification of Nonlinear Write Effects Using Pseudorandom Sequences, IEEE Transactions on Magnetics, vol. Mag–23, No. 5, Sep. 1987, pp. 2377–2379.*

* cited by examiner

Primary Examiner—David Hudspeth
Assistant Examiner—Dan I Davidson
(74) Attorney, Agent, or Firm—Westman, Champlin & Kelly, P.A.; Todd R. Fronek

(57) ABSTRACT

A method for measuring spacing between a head and a storage medium is provided. The method includes obtaining a sample of a readback signal from a sequence of data stored on the storage medium using the head. An amplitude of the readback signal for a plurality of frequencies is calculated. Additionally, the method includes providing a measurement indicative of spacing between the head and the storage medium based on the amplitude.

17 Claims, 6 Drawing Sheets

| | | Elevation (ft) | F.H. delta (u") | 95% con. Level (u") | 3 sigma (u") |
|---|---|---|---|---|---|
| Hd0 | cyl 300 | 0 | 0.000 | 0.005 | 0.008 |
| | | 4.5 | -0.022 | 0.005 | 0.007 |
| | | 9 | -0.037 | 0.004 | 0.006 |
| | | 13.5 | -0.044 | 0.004 | 0.006 |
| | | 15.5 | -0.055 | 0.005 | 0.007 |
| Hd1 | cyl 300 | 0 | 0.000 | 0.004 | 0.006 |
| | | 4.5 | -0.027 | 0.006 | 0.009 |
| | | 9 | -0.051 | 0.006 | 0.009 |
| | | 13.5 | -0.073 | 0.008 | 0.012 |
| | | 15.5 | -0.081 | 0.010 | 0.015 |
| Hd0 | cyl 31000 | 0 | 0.000 | 0.003 | 0.005 |
| | | 4.5 | -0.044 | 0.004 | 0.006 |
| | | 9 | -0.078 | 0.005 | 0.007 |
| | | 13.5 | -0.104 | 0.006 | 0.010 |
| | | 17 | -0.121 | | |
| Hd1 | cyl 31000 | 0 | 0.000 | 0.005 | 0.008 |
| | | 4.5 | -0.045 | 0.011 | 0.017 |
| | | 9 | -0.087 | 0.012 | 0.018 |
| | | 13.5 | -0.118 | 0.012 | 0.018 |
| | | 17 | -0.140 | | |

HIGH PRECISION FLY HEIGHT MEASUREMENT

FIELD OF THE INVENTION

The present invention relates to data storage systems. In particular, the invention relates to a method and apparatus for determining spacing between a transducer and a storage medium in a data storage system.

BACKGROUND OF THE INVENTION

In magnetic storage systems, a magnetic disc rotates at high speeds. A read/write transducing head "flies" over the surface of the disc carried on a slider and is used for reading and writing information. The slider has certain hydrodynamic properties that provide lift while the drive rotates. This lift is counteracted by a spring loaded flexure armature which supports the slider. The slider reaches an equilibrium fly height based principally upon the speed of rotation of the disc, the hydrodynamic properties of the slider and the spring tension of the flexure armature. Improved reading and writing characteristics are achieved as the slider flies closer to the disc surface.

Various techniques have been used to measure the fly height of a slider. One technique to measure fly height is by measuring electrical capacitance between the slider and the disc. Another common technique to measure fly height uses optical methods. Yet another technique uses the amplitude of magnetic read back signals to determine fly height. A well known equation for determining fly height using amplitude of readback signals is known as the "Wallace equation". Current methods using the Wallace equation use a prerecorded portion of data to measure the readback signals. Accordingly, fly height can only be measured on the portion having the prerecorded data. Additionally, current methods have relatively low precision. Embodiments of the present invention provide solutions to these and other problems, and offer other advantages over the prior art.

SUMMARY OF THE INVENTION

A method for measuring spacing between a head and a storage medium is provided. The method includes obtaining a sample of a readback signal from a sequence of data stored on the storage medium using the head. An amplitude of the readback signal for a plurality of frequencies is calculated. Additionally, the method includes providing a measurement indicative of spacing between the head and the storage medium based on the amplitude.

A system is also provided that includes a storage medium and a head configured to obtain a sample of a readback signal from a sequence of data stored on the storage medium. A calculation circuit is configured to calculate an amplitude of the readback signal for a plurality of frequencies and provide a measurement indicative of spacing between the head and the storage medium based on the amplitude.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
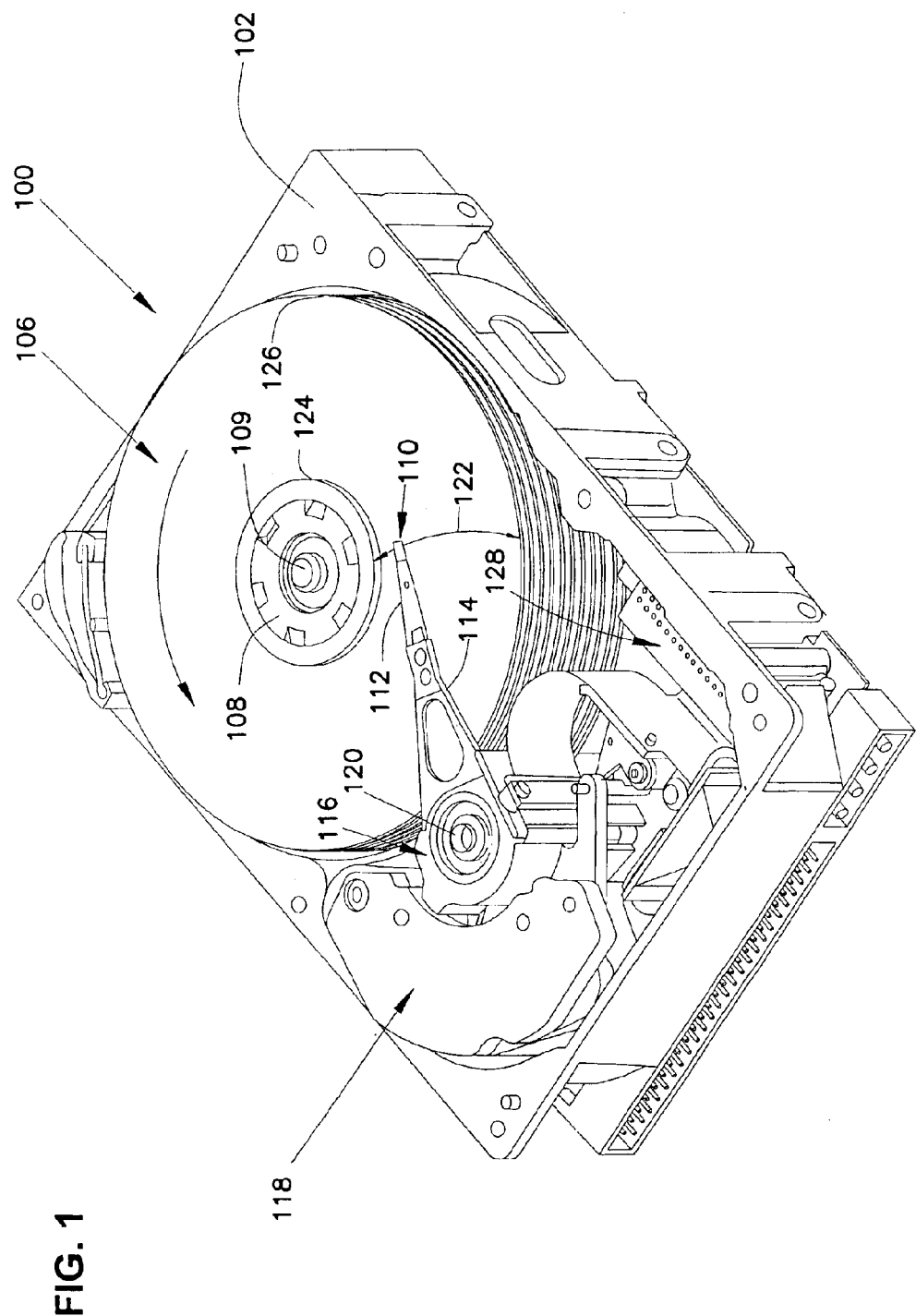
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 128 based on signals generated by heads 110 and a host computer (not shown).

Figure 2:
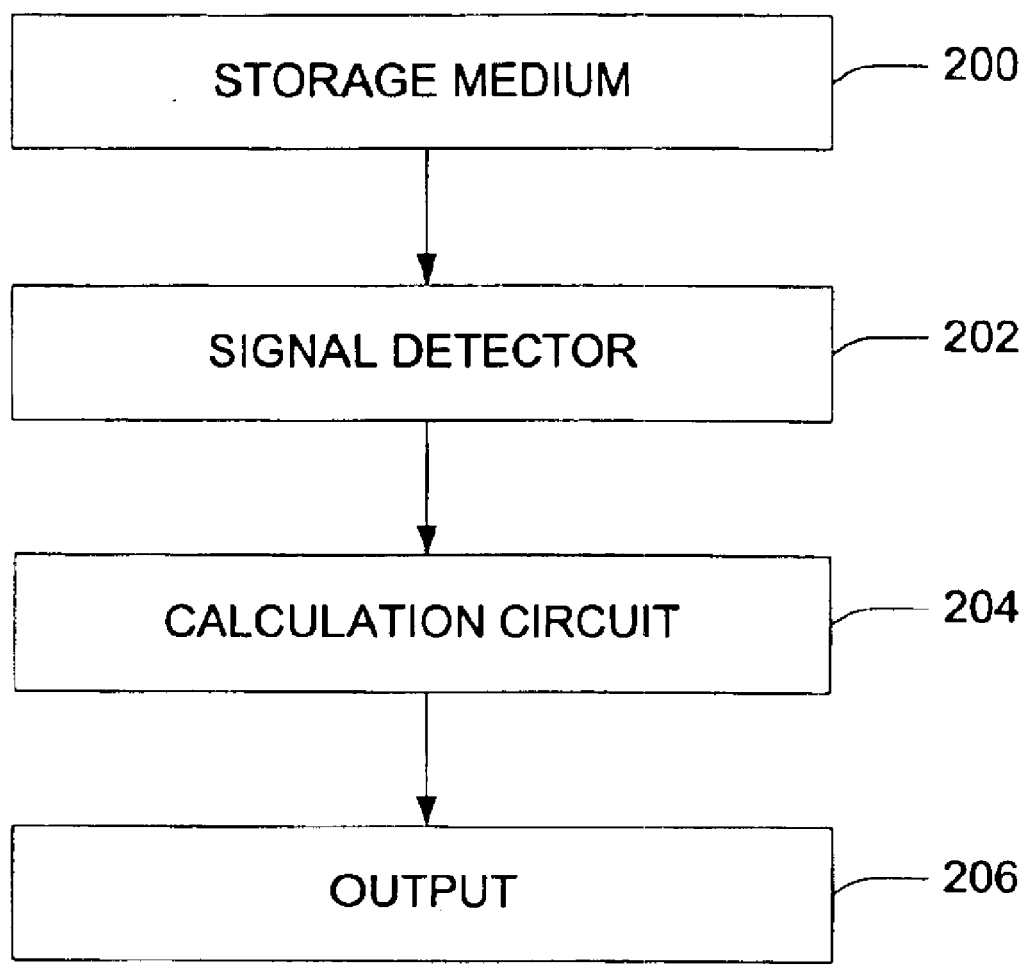
FIG. 2 is a flow diagram of components for analyzing a readback signal for calculating fly height measurement.

FIG. 2 illustrates a flow diagram of components used for analyzing a readback signal in order to calculate spacing between a transducer and a storage medium. Data is stored on a storage medium 200 such as a disc. For example, the data may include magnetic transitions on a magnetic disc. A suitable signal detector 202 that includes a transducer senses a readback signal indicative of data stored on storage medium 200. This transducer senses the magnetic transitions on the storage medium. Calculation circuit 204 provides calculations on the signal received from signal detector 202 in order to provide an output 206 indicative of spacing between a transducer and a storage medium. As discussed below, calculation circuit 204 performs a Fourier transformation on the signal detected by signal detector 202. The Fourier transformation transforms the signal from the time domain to the frequency domain, where amplitude of the signal is expressed as a function of frequency. In one embodiment, calculation circuitry 204 can access a look-up table having values indicative of the Fourier transformation in order to reduce the computation each time a fly-height measurement is taken.

Figure 3:
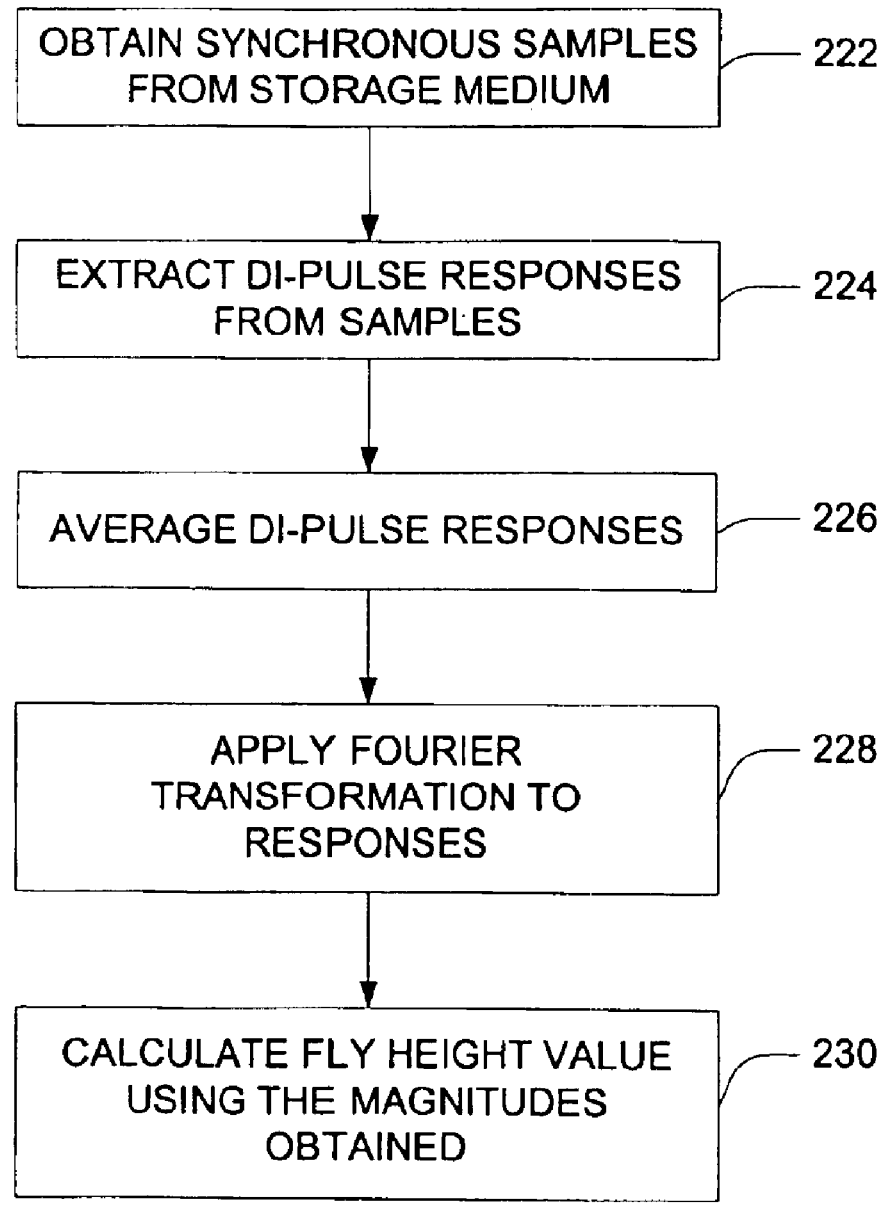
FIG. 3 is a flow diagram of a method for measuring fly height in accordance with an embodiment of the present invention.

FIG. 3 illustrates a flow diagram of a method 220 in accordance with an embodiment of the present invention. The method 220 begins at step 222 wherein synchronous samples are obtained from the storage medium. In one embodiment, multiple samples are taken of a 127-bit pseudo-random sequence. The pseudo-random sequence may be a specific sequence of binary sequences that include a broad range of frequencies. Including a broad range of frequencies aids in achieving a more precise measurement of spacing and an improved signal-to-noise ratio. However, analyzing user data sequences, random sequences or other sequences may also be used to determine spacing. At step 224 di-pulse responses are extracted from the sample. A di-pulse includes a pair of pulses with opposite polarity. The di-pulses represent a suitable signal that can be analyzed to determine spacing. "Extracting" the di-pulse refers to determining signal properties corresponding to the data sequence that is used for further analysis. The extracted di-pulse responses of each of the samples are then averaged at step 226. The averaging acts to minimize noise since multiple signals of the same sample sequence are obtained. Using the averaged responses, a Fourier transformation is performed on the responses to compute a power spectrum of the obtained signals at step 228. The Fourier transformation may be represented as:

$$X(k) = \sum_{n=1}^{N} x(n)e^{\left(\frac{-j2\pi(k-1)(n-1)}{N}\right)}, 1 \le k \le n;$$

where: x(n) are samples of the di-pulse response;
k is an index corresponding to frequencies;
X(k) is the spectrum of the di-pulse for frequency indicated by k;
j is the imaginary number, or the square root of −1; and
N is 127, the number of bits in the pseudo-random sequence.

The Fourier transformation is a discrete transformation that transforms signals from the time domain to the frequency domain. In the frequency domain, the signal is represented by its magnitude as a function of frequency. Using the magnitude, a fly height difference value can be calculated from the power spectrum at step 230, for example by using the Wallace equation. The Wallace equation can be represented as:

$$\Delta h = -\frac{\lambda \Delta spectrum \text{ (dB)}}{40\pi \log_{10}(e)};$$

where: Δh is the change in fly height;
λ is the wavelength in distance between magnetic transitions that define data; and
Δspectrum(dB) is the change in the spectrum in decibels.

As a result of calculation of the Wallace equation, a value characteristic of fly height is obtained, namely a change in fly height value. Using various techniques, the value can be compared with other values to obtain an accurate fly height measurement. For example, the fly height of the slider may be changed to a known height and results from an additional implementation of method 220 at the known height can be compared to the obtained value characteristic of the fly height. In the case of in-situ fly height measurement, the relative value can be obtained at different times and the relative values at each time can be compared.

Figure 4:
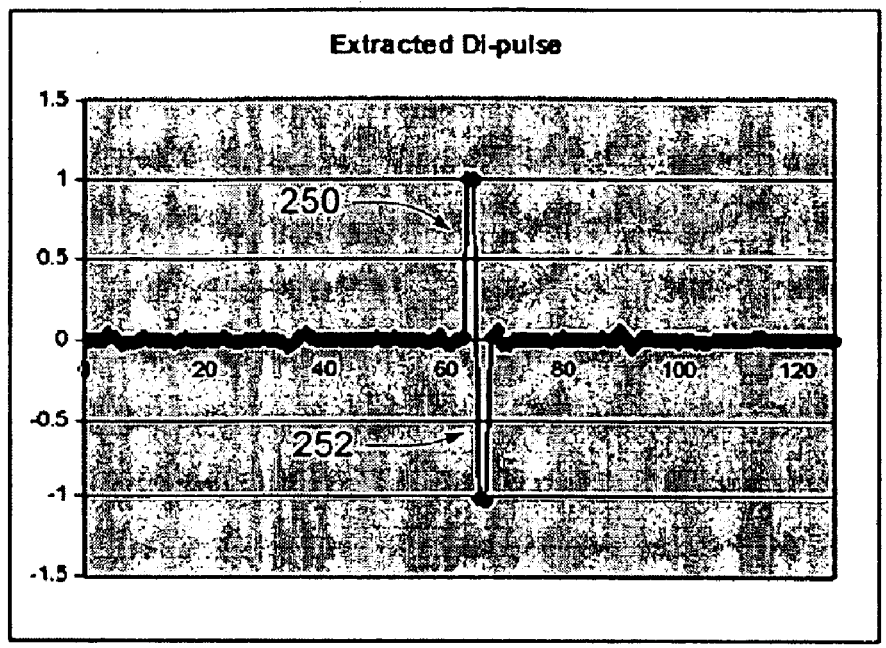
FIG. 4 is a sample graph of an extracted di-pulse response.
Figure 5:
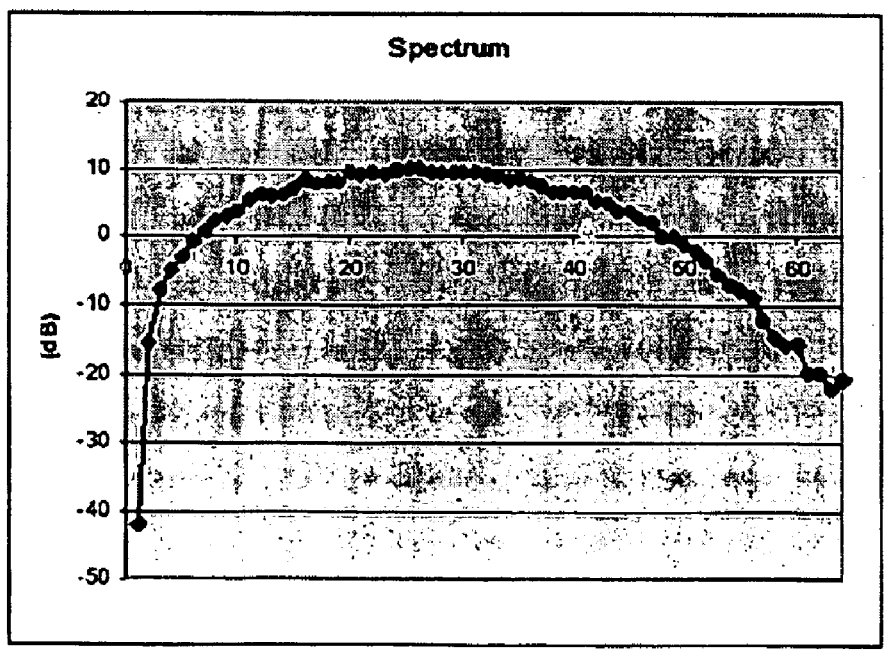
FIG. 5 is a power spectrum of the di-pulse response in FIG. 4.

In order to verify method 220 as a suitable measurement indicative of fly height, experiments were conducted. In one experiment, two disc drives were used and samples were taken at four different elevations for each drive with two different cylinder sizes. The elevations were emulated by altering ambient pressure within the drive. FIG. 4 illustrates a sample extracted di-pulse from a 127-bit pseudo-random sequence. Given the bit pattern and waveform of the 127-bit pseudo-random sequence, the di-pulse can be extracted. The extracted di-pulse is representative of transitions on the storage medium and include a positive pulse 250 and a negative pulse 252. FIG. 5 illustrates a power spectrum for multiple frequencies as a result of a Fourier transformation of the di-pulse response obtained in FIG. 4. The graph shows computed values for the magnitude (or amplitude) of signals in decibels as a function of frequency. As illustrated, a large number and range of frequencies are computed to provide a more precise measurement. The spectrum provides frequency content of the extracted di-pulse.

Figure 6:
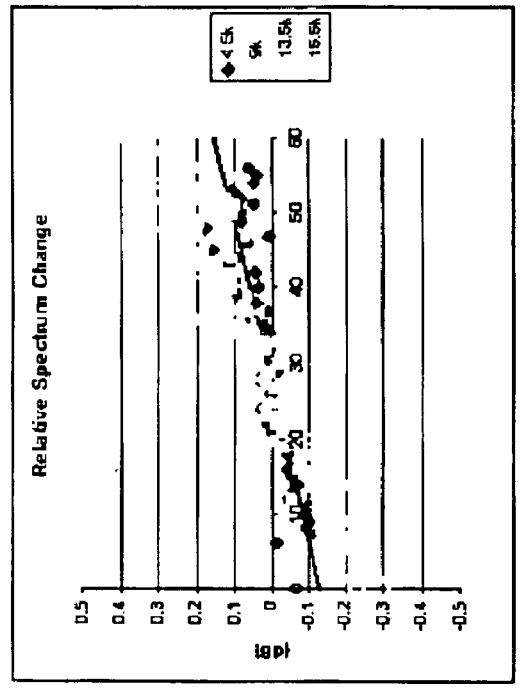
FIG. 6 is a graph of a linear regression analysis.
Figure 7:
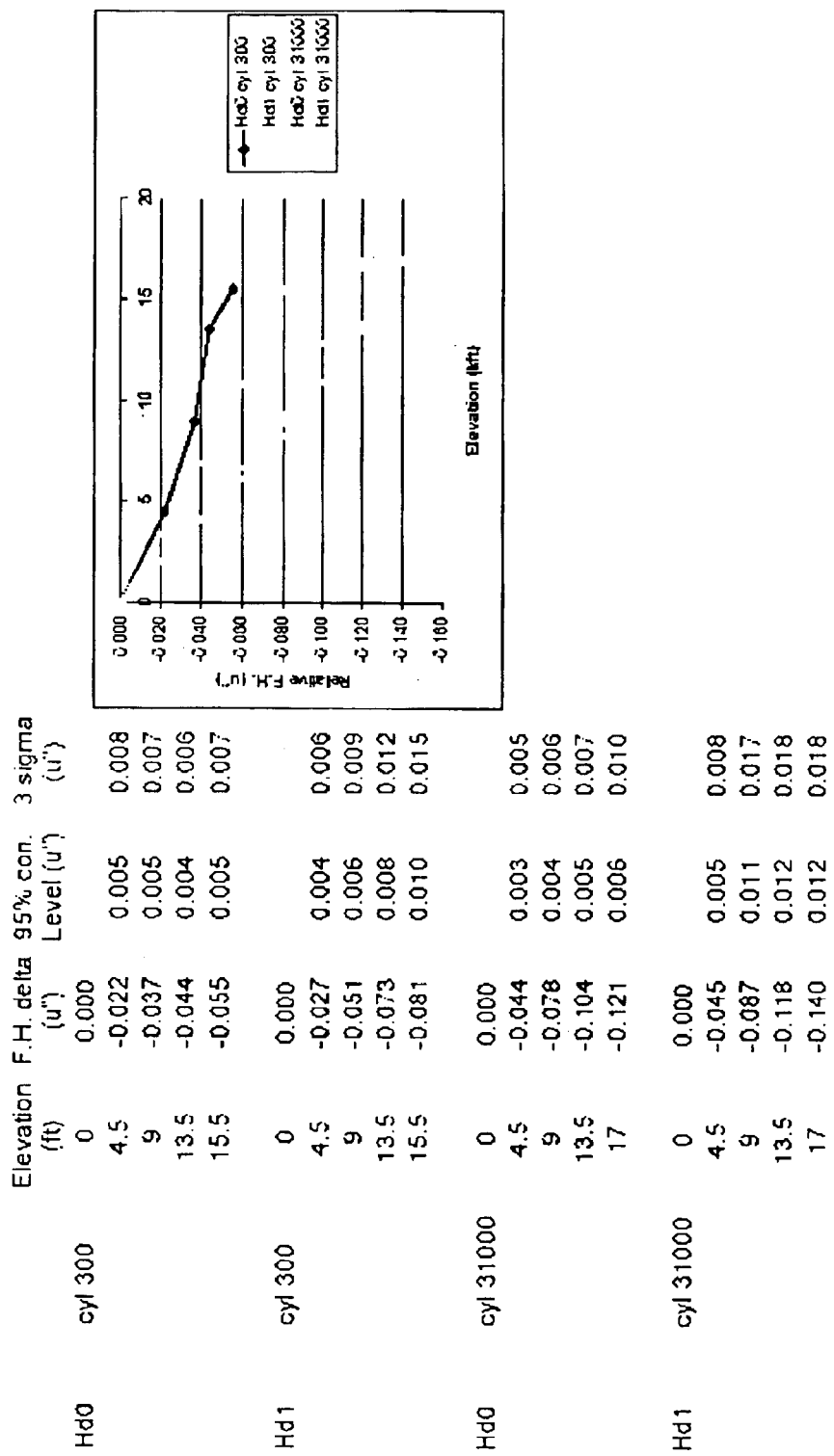
FIG. 7 is a graph of comparative relative fly height values.

FIG. 6 is a graph of a linear regression of the relative spectrum change, wherein the slope of the linear regression is proportional to the fly height. A sample statistical analysis of experimental data is provided in FIG. 6. The relatively low p-values in FIG. 6 demonstrate a low margin of error for the measurements. FIG. 7 illustrates a graph of relative fly height values for various elevations of the two hard drives and cylinder sizes. Each of the relative fly heights change depending on the elevation. FIG. 7 also contains relative fly height values and statistical analysis data for the experiments conducted.

By analyzing the frequency content of an extracted di-pulse of a waveform taken from a pseudo-random sequence of data, a precise measurement indicative of fly height can be achieved. The measurement can be done in-situ on data sequences stored on a disc. If a 127-bit pseudo-random sequence of data is used, numerous measurements can be taken on various portions of the disc surface. A look-up table may be stored on the disc to reduce the amount of calculations necessary to provide fly height measurements.

A method (220) for measuring spacing between a head (110, 202) and a storage medium (106, 200) is provided. The method (200) includes obtaining (222) a sample of a readback signal from a sequence of data stored on the storage medium (106, 200) using the head. An amplitude of the readback signal for a plurality of frequencies is calculated (228). Additionally, the method includes providing (230) a measurement indicative of spacing between the head (110, 202) and the storage medium (106, 200) based on the amplitude.

A system is also provided that includes a storage medium (106, 200) and a head (110, 202) configured to obtain a sample of a readback signal from a sequence of data stored on the storage medium (106, 200). A calculation circuit (204) is configured to calculate an amplitude of the readback signal for a plurality of frequencies and provide a measurement indicative of spacing between the head (110, 202) and the storage medium (106, 200) based on the amplitude.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a magnetic storage system for determining spacing between a slider and a disc surface, it will be appreciated by those skilled in the art that the teachings of the present invention can be applied to other spacing measurement applications, without departing from the scope and spirit of the present invention.

What is claimed is:

1. A method for measuring spacing between a head and a storage medium, comprising:

obtaining a sample of a readback signal from a sequence of data stored on the storage mediujn using the head;

calculating an amplitude of the sample of the readback signal for a plurality of frequencies by extracting di-pulse responses from the sequence of data; and providing a measurement indicative pf spacing between the head and the storage medium based on the amplitude.

2. The method of claim 1 wherein calculating comprises performing a Fourier transformation on the di-pulse responses to represent the amplitude as a function of frequency.

3. The method of claim 2 wherein the Fourier transformation can be expressed as:

$$X(k) = \sum_{n=1}^{N} x(n) e^{\left(\frac{-j2\pi(k-1)(n-1)}{N}\right)}, 1 \leq k \leq n;$$

where: x(n) are samples of the di-pulse response;
k is an index corresponding to frequencies;
X(k) is the spectrum of the di-pulse for frequency indicated by k;
j is the imaginary number, or the square root of −1; and
N is a number of bits in the sequence of data.

4. The method of claim 1 wherein obtaining further comprises obtaining multiple samples of readback signals of the sequence of data and calculating further comprises averaging the di-pulse responses for each frequency.

5. The method of claim 1 wherein the measurement can be expressed as:

$$\Delta h = \frac{\lambda \Delta spectrum \ (dB)}{40\pi \log_{10}(e)};$$

where: $\Delta h$ is the change in fly height;
$\lambda$ is the wavelength in distance between magnetic transitions that define data; and
$\Delta spectrum(dB)$ is the change in the spectrum in decibels.

6. A data storage system comprising:
a storage medium;
a head configured to obtain a sample of a readback signal from a sequence of data stored on the storage medium; and
a calculation circuit configured to extract di-pulse responses from the sequence of data, calculate an amplitude of the sample of the readback signal for a plurality of frequencies and provide a measurement indicative of spacing between the head and the storage medium based on the amplitude.

7. The system of claim 6 wherein the calculation circuit is further configured to perform a Fourier transformation on the di-pulse responses to represent the readback signal amplitude as a function of frequency.

8. The system of claim 7 wherein the Fourier transformation can be expressed as:

$$X(k) = \sum_{n=1}^{N} x(n) e^{\left(\frac{-j2\pi(k-1)(n-1)}{N}\right)}, 1 \leq k \leq n;$$

where: x(n) are samples of the di-pulse response;
k is an index corresponding to frequencies;
X(k) is the spectrum of the di-pulse for frequency indicated by k;
j is the imaginary number, pr the square root of −1; and
N is a number of bits in the sequence of data.

9. The system of claim 6 wherein the head is configured to obtain multiple samples of readback signals of the sequence of data and the calculation circuit is further configured to average the di-pulse responses for each frequency.

10. The system of claim 6 wherein the measurement can be expressed as:

$$\Delta h = -\frac{\lambda \Delta spectrum \ (dB)}{40\pi \log_{10}(e)};$$

where: $\Delta h$ is the change in fly height;
$\lambda$ is the wavelength in distance between magnetic transitions that define data; and
$\Delta spectrum(dB)$ is the change in the spectrum in decibels.

11. The system of claim 6 wherein the calculation circuit is configured to access a look-up table.

12. A data storqge system comprising:
a storage medium;
a head configured to obtain a sample of a readback signal from a sequence of data stored on the storage medium;
means for extracting di-pulse responses from the sample of the readback signal; and
means for calculating an amplitude of the sample of the readback signal for a plurality of frequencies and for providing a measurement indicative of spacing between the head and the storage medium based on the amplitude.

13. The system of claim 12 and further comprising means for performing a Fourier transformation on the di-pulse responses to represent the readback signal amplitude as a function of frequency.

14. The system of claim 13 wherein the Fourier transformation can be expressed as:

$$X(k) = \sum_{n=1}^{N} x(n) e^{\left(\frac{-j2\pi(k-1)(n-1)}{N}\right)}, 1 \leq k \leq n;$$

where: x(n) are samples of the di-pulse response;
k is an index corresponding to frequencies;
X(k) is the spectrum of the di-pulse for frequency indicated by k;
j is the imaginary number, or the square root of −1; and
N is a number of bits in the sequence of data.

15. The system of claim 12 wherein the head is configured to obtajn multiple samples of readback signals of the sequence of data and further comprising means for averaging the di-pulse responses for each frequency.

16. The system of claim 12 wherein the measurement can be expressed as:

$$\Delta h = -\frac{\lambda \Delta spectrum \ (dB)}{40\pi \log_{10}(e)};$$

where: $\Delta h$ is the change in fly height;
$\lambda$ is the wavelength in distance between magnetic transitions that define date; and
$\Delta spectrum(dB)$ is the change in the spectrum in decibels.

17. The system of claim 12 and further comprising means for accessing a look-up table.

* * * * *